H. K. McCLURE.
TROLLEY.
APPLICATION FILED FEB. 15, 1915.
1,246,627.
Patented Nov. 13, 1917.
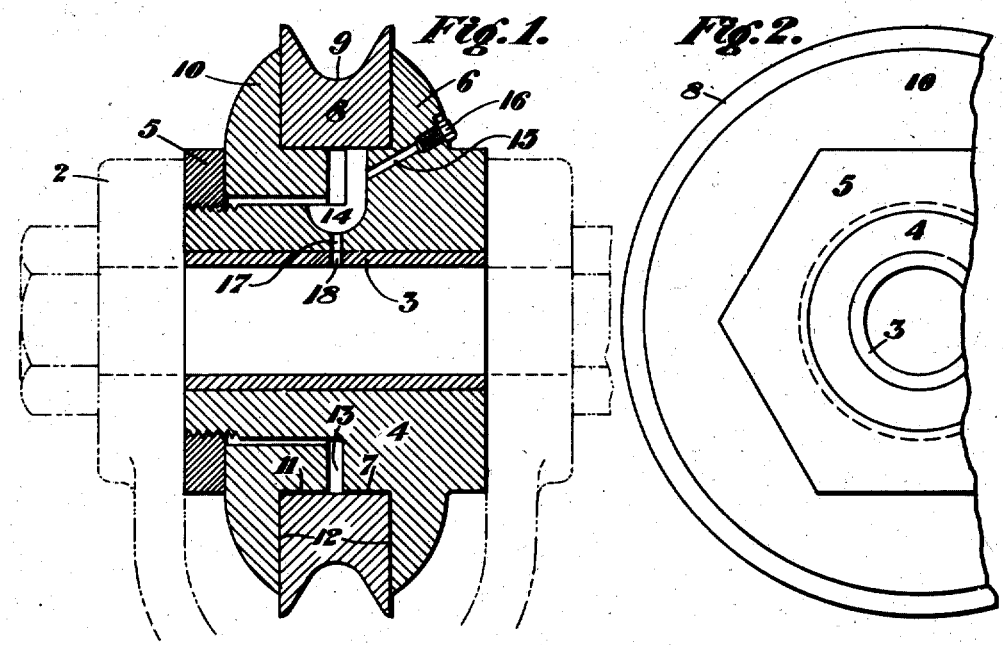
Witnesses:
Inventor:
Harry K. McClure

UNITED STATES PATENT OFFICE.

HARRY K. McCLURE, OF ELK LICK, PENNSYLVANIA.

TROLLEY.

1,246,627.  Specification of Letters Patent.  Patented Nov. 13, 1917.

Application filed February 15, 1915. Serial No. 8,168.

*To all whom it may concern:*

Be it known that I, HARRY K. MCCLURE, a citizen of the United States, residing at Elk Lick, in the county of Somerset and State of Pennsylvania, have invented certain new and useful Improvements in Trolleys, of which the following is a specification.

My invention consists of an improvement in trolleys for street car and other service, in providing a rolling conductor between the trolley wire and the motor.

It has for its object to provide a construction in which the wearing or contacting portion of the wheel is so constructed and mounted, in connection with and relation to the main revoluble wheel member, as to provide for easy removal and renewal, thus effecting a very considerable saving in the wheel, and avoiding the usual necessity of replacing a worn wheel with an entirely new one.

Preferred constructions embodying the invention are illustrated in the accompanying drawings, in which—

Figure 1 is a vertical sectional view through a trolley wheel showing one form of the invention.

Fig. 2 is a partial side elevation of Fig. 1.

In the drawings, the entire revoluble wheel structure is mounted to revolve around a supporting central spindle, which, by its outer ends, is carried in the usual terminals of a supporting harp 2, indicated in dotted lines. The spindle, which is of the usual construction, is secured in the harp by means of the usual nut or nuts, and is provided, between the harp terminals, with an embracing bushing 3 of suitable material, as bronze, copper, etc., adapted to provide a surrounding bearing for the revoluble hub member or members of the wheel.

These hub members, as shown in Fig. 1, comprise the main hub 4, the central transverse cylindrical opening through which engages around the bushing 3 for easy rotation thereon.

Hub 4 extends co-extensive with said bushing from one end to the other, between the harp terminals 2, and is provided at one end with a locking or abutment nut 5. At one side of the transverse center, hub 4 extends laterally, providing a supporting and resisting edge portion 6, the inner side of which is recessed annularly, providing a shouldered middle bearing portion 7 and an inner flat face on the inner side of extension 6, adapted to receive the renewable contact ring 8.

Said ring, as shown, is provided centrally of its periphery with the trolley wire-engaging groove 9, the edges of which flare outwardly, so as to provide for easy engagement with the wire, somewhat in the manner of the usual one-piece trolley wheel.

Between the main hub 4 and the locking nut 5 is the co-acting supplemental hub member 10, the inner and outer faces of which correspond to the opposite hub extension 6, and provides at its inner face a flat surface adapted to engage against the confronting face of the wheel 8, and also a supporting annular face 11 for the inner portion of the wheel, as will be readily understood. Wheel 8, as shown, is rectangular in cross section, as to its main body portion and inner periphery, providing a co-acting inner annular diametrical surface and the outer parallel side faces 12.

The tapering edge portions of the wheel 8 extend preferably somewhat beyond the lateral hub extensions 6 and 10, and the wheel itself is of sufficient depth from the outer bottom of the groove to the inner circular face to provide an ample body portion for the bearing strain of the wire, and for deterioration or reducing wear in action.

The inner supporting edge portions of the main and supplemental hub members are spaced apart, when said members are in operative position, as shown, sufficiently far to provide an intervening annular cavity 13, which, at any point annularly of the main hub 4, is enlarged, so as to provide a lubricant cavity 14.

A supply port 15 having a suitable closure 16 provides for filling of the cavity and annular space with a suitable lubricant, and by ports 17 and 18, through the hub 4 and bushing 3, lubricant is supplied to the wearing surfaces, *i. e.*, both outside and inside of the bushing, should the bushing itself revolve with the hub.

By this construction it will be seen that the main body portion of the wheel comprising the holding hubs, as thus mounted, receive no wear whatever, and are practically indestructible. The wheel 8, being comparatively small and light, is capable of being easily mounted in the hub structure and of being removed by replacement by a new wheel when worn.

Its advantages will be readily appreciated by all those familiar with this class of devices. It enables the very material saving of metal by limiting the actual contacting element of the entire wheel to the removable peripheral grooved wheel. The construction and arrangement of the hub members greatly facilitate the placement or removal of the parts. It is extremely simple, compact and inexpensive in construction, not liable to get out of order, and effects a very material saving and resulting advantage by reason of its construction.

It will be understood that the invention may be variously changed or modified by the skilled mechanic in different features or details, but that all such are to be considered as within the scope of the following claim.

What I claim is:

In combination with the harp, spindle and bushing; of a hub rotatably mounted on said bushing having a central barrel, an annular retaining flange at one side of said hub, an annular inwardly extending bearing portion integral with said flange, a threaded terminal at the other side of said hub, a supplemental hub member telescoping said barrel, said supplemental bearing having an annular retaining flange and an annular inwardly extending bearing portion, said last named bearing portion being spaced from said first named bearing portion, forming a recess, said recess being enlarged at a point annularly of said hub forming a lubricating cavity, a trolley wheel on said bearing portion and a locking member screw-threaded on said threaded terminal adapted to clamp said wheel in place.

In testimony whereof I hereunto affix my signature in the presence of two witnesses.

HARRY K. McCLURE.

Witnesses:
A. E. LIVENGOOD,
ALBERT REITZ.

Copies of this patent may be obtained for five cents each, by addressing the "Commissioner of Patents, Washington, D. C."